United States Patent [19]

Bingaman et al.

[11] Patent Number: 4,858,808
[45] Date of Patent: Aug. 22, 1989

[54] TAPE HANDLING APPARATUS

[75] Inventors: Barrett P. Bingaman, Glendale; Richard G. Krum, Thousand Oaks; James R. Williams, Sun Valley, all of Calif.

[73] Assignee: Cetec Corporation, El Monte, Calif.

[21] Appl. No.: 54,745

[22] Filed: May 27, 1987

[51] Int. Cl.⁴ .................... B65H 20/14; B65H 20/12; B65H 20/28
[52] U.S. Cl. ........................ 226/95; 226/97; 226/118
[58] Field of Search ........................ 226/95, 97, 118; 242/182; 360/93, 132

[56] References Cited

U.S. PATENT DOCUMENTS

| | | |
|---|---|---|
| 3,319,861 | 5/1967 | Molina et al. .................. 226/97 X |
| 3,493,948 | 2/1970 | Ironside et al. . |
| 3,499,589 | 3/1970 | Johnson et al. . |
| 3,528,593 | 9/1970 | Armstrong et al. . |
| 3,543,983 | 12/1970 | Dale et al. . |
| 3,608,798 | 9/1971 | Lawless . |
| 3,633,807 | 1/1972 | Williams . |
| 3,693,859 | 9/1972 | Nielsen . |
| 3,698,723 | 10/1972 | Kobler et al. . |
| 3,752,379 | 8/1973 | Di Padova et al. . |
| 3,754,723 | 8/1973 | Meyer .......................... 242/182 X |
| 3,918,092 | 11/1975 | Rueger ............................ 226/95 |
| 4,000,516 | 12/1976 | Watanabe et al. . |
| 4,127,225 | 11/1978 | King . |
| 4,128,198 | 12/1978 | Woodley . |
| 4,194,661 | 3/1980 | Grant ............................. 226/95 |
| 4,213,159 | 7/1980 | King ........................... 226/95 X |
| 4,328,626 | 5/1982 | Leitner ........................ 226/95 X |
| 4,381,212 | 4/1983 | Roberts ....................... 226/95 X |
| 4,387,843 | 6/1983 | Rehklau . |
| 4,394,951 | 7/1983 | Ruda et al. . |
| 4,700,909 | 10/1987 | Lohrenz et al. ............. 226/97 X |

Primary Examiner—John M. Jillions
Attorney, Agent, or Firm—Harris, Kern, Wallen & Tinsley

[57] ABSTRACT

A tape handling apparatus for storing an endless loop of tape in a bin and moving the tape from the bin exit past a reproduce head assembly to the bin entrance for use in duplication of the tape. A tape handling apparatus with a tape injection assembly at the bin entrance for injecting tape into the bin and a tape removal assembly at the bin exit for removing tape from the bin, with the tape being driven through the tape injection assembly to reduce the tape forward speed as it enters the bin, and with the tape being pulled from the bin by the reproduce head assembly through the tape removal assembly for establishing tension in the tape.

27 Claims, 9 Drawing Sheets

TAPE HANDLING APPARATUS

BACKGROUND OF THE INVENTION

This invention relates to a new and improved tape handling apparatus and in particular, to an apparatus suitable for handling an endless loop of magnetic tape for making duplicates of the tape. Apparatus of this type, sometimes referred to as a tape duplicator, is widely used in the audio tape field for producing duplicates of audio master tapes for packaging in cassettes.

Apparatus of this general nature is shown in U.S. Pat. Nos. 3,499,589 and 3,608,798. The general arrangement of such tape handling apparatus includes a tape loop bin in which the major portion of the endless loop of tape is stored. The tape is pulled from one end of the bin, moved past a reproduce head assembly, and injected into the opposite end of the bin when a horizontal bin is utilized. When a vertical bin is utilized, typically the tape is both pulled from and injected into the top of the bin. In operation, the forward speed of the tape moving from the bin past the reproduce head assembly and back to the bin is relatively high, while the forward speed of the tape in the bin is relatively low.

In duplicating a tape by this method, the entire tape has to be moved past the reproduce head in order to produce a duplicate, in contrast to the manufacture of a phonograph record where the entire performance is produced in a single pressing operation. Hence production of tape duplicates is a time consuming operation and therefore it is desirable to have a tape handling apparatus which can be operated at higher and higher speeds and which can have greater tape capacity.

Accordingly, it is an object of the present invention to provide a new and improved tape handling apparatus capable of operating at higher speeds under continuous operating conditions and without requiring particular operator attention.

By way of example, a present day tape handling apparatus will handle about 1,800 feet of tape operating at a tape linear speed of about 240 inches per second. The presently preferred embodiment of the present invention will handle 2,400 feet of tape operating at a tape linear speed of 480 inches per second.

A typical magnetic tape comprises a plastic strip with a layer of magnetic material on one side. The magnetic heads used in tape reading and tape writing make rubbing contact with the magnetic material side of the tape and this cannot be avoided since it is required in the operation. However continued contact with the magnetic material tends to deteriorate the tape and therefore it is another object of the present invention to provide a tape handling apparatus wherein the only contact with the magnetic material side of the tape occurs at the magnetic head or heads in the reproduce head assembly.

Other objects, advantages, features and results will more fully appear in the course of the following description.

SUMMARY OF THE INVENTION

A tape handling apparatus for storing an endless loop of tape in a bin and moving the tape from the bin exit past the reproduce head assembly to the bin entrance, with a tape injection assembly at the bin entrance for injecting tape into the bin and a tape removal assembly at the bin exit for removing tape from the bin.

A tape injection assembly with the tape being driven along a curved entrance guide wall, preferably with air jets and ramps along the wall, to produce a serpentine tape path thereby reducing the momentum and forward speed of the tape as it enters the bin. A tape removal assembly having an exit pocket with vacuum guide walls joined at a vacuum corner to provide tape tension and a variable length pocket for the tape leaving the bin, along with another vacuum exit wall at the bin exit to provide additional tension in the tape between the bin and the reproduce head assembly which pulls the tape from the bin. Air bearings for tape support and guidance which do not contact the tape, and vacuum capstans for engaging and driving the tape through the apparatus.

BRIEF DESCRIPTION OF THE DRAWINGS

FIG. 3 is an enlarged partial top view of the reproduce head assembly of FIG. 2a;

FIG. 12 is an enlarged partial sectional view taken along the line 12—12 of FIG. 2a;

FIG. 13 is an enlarged partial sectional view taken along the line 13—13 of FIG. 2a; and FIG. 14 is an enlarged view of the structure shown in the dashed circle 14 of FIG. 2a.

DESCRIPTION OF THE PREFERRED EMBODIMENT

Figure 1:
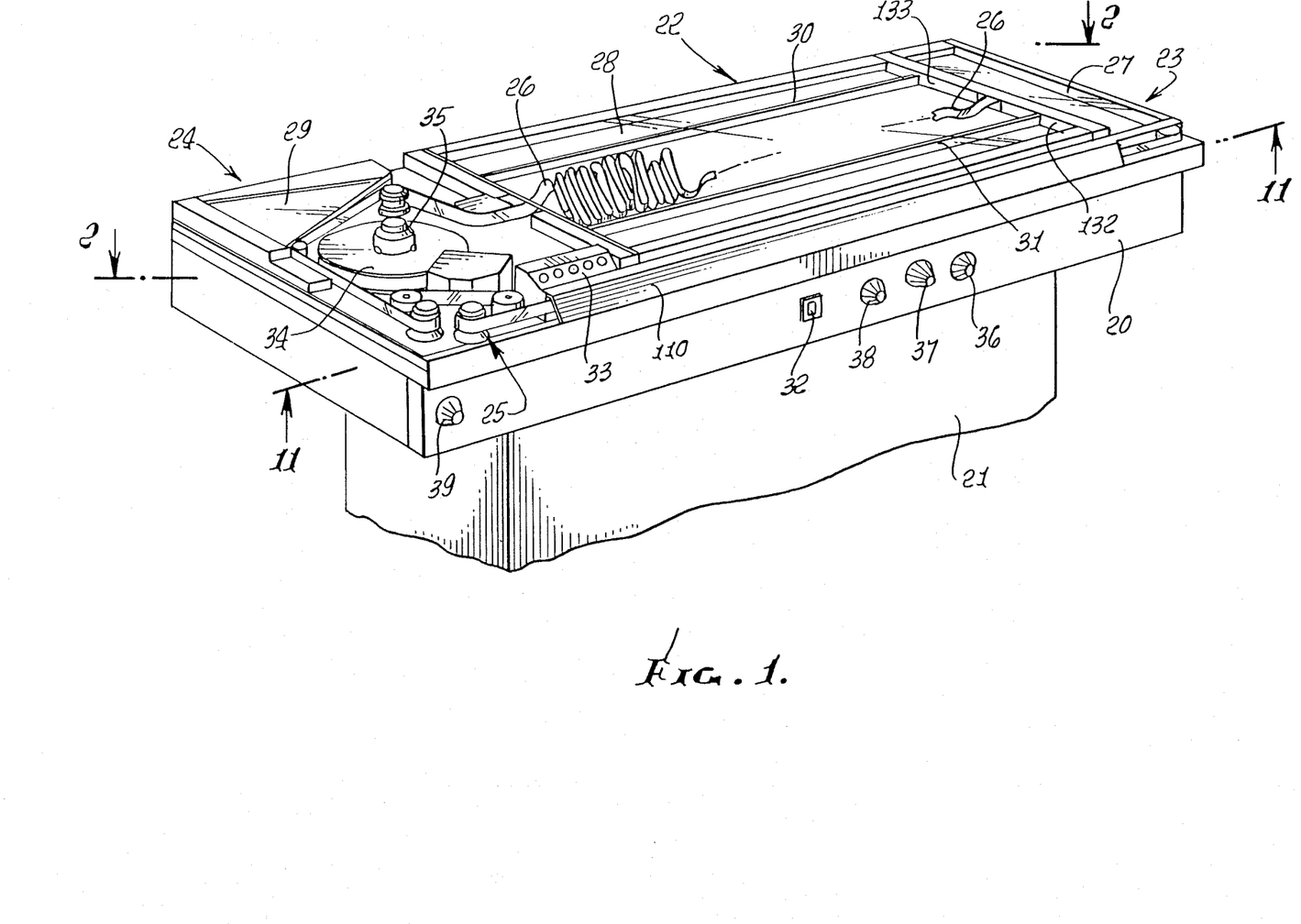
FIG. 1 is a perspective view of a tape handling apparatus incorporating the presently preferred embodiment of the invention.

Referring to FIG. 1, the tape handling apparatus is carried on and within a housing 20 which rests on a pedestal 21. A bin 22 is positioned between a tape injection assembly 23 and a tape removal assembly 24, with a tape reproduce head assembly 25 at the exit end of the bin. An endless loop of magnetic tape 26 runs from the bin through the removal assembly 24, the reproduce head assembly 25 and the injection assembly 23 back into the bin 22, with the major portion of the loop stored in the bin in a folded position. Typically about ten feet of a 2,400 foot tape will be in the path from the bin through the various assemblies back to the bin, with the remainder of the tape stored in the bin.

Typically the bin, the injection assembly and the removal assembly have glass or transparent plastic covers 27, 28, 29. In the preferred embodiment, bars 30, 31 are spaced from each other within the bin and are movable laterally to provide adjustment for the bin size so that the handling apparatus may be operated optimally for various lengths of tapes. The positions of the bars 30, 31 may be adjusted manually or by a motor-driven mechanism, and in the embodiment illustrated the bars are driven by an electric motor controlled by a switch 32. The motor drive will be described in detail herein below. A control block 33 carrying a plurality of control switches is mounted on the housing for easy access to the switches. A tape reel 34 is shown mounted on a reel drive hub 35 adjacent the reproduce head assembly 25.

At the start of a tape duplication operation, a reel of the master tape is mounted on the drive hub 35 and fed into the tape handling apparatus. When the entire length of tape has been removed from the reel, the start and end of the tape are spliced together to form the endless loop. After the tape duplicating operation has been completed, the tape is unspliced, the end of the tape is fed into the reel, and the apparatus is operated in the opposite direction to wind the tape back onto the reel, thereby leaving the tape on the reel in the proper orientation for subsequent use.

Air pressure is used in the operation of the tape handling apparatus, and three pressure control adjustment knobs 36, 37, 38 are mounted on the housing 20. The knob 36 controls the injection air, the knob 37 controls the entrance air, and the knob 38 controls the exit air, as will be described below.

The knob 39 provides for remote control of the bias level of the magnetic heads in the slave recorder head assemblies in the conventional manner.

Figure 2A:
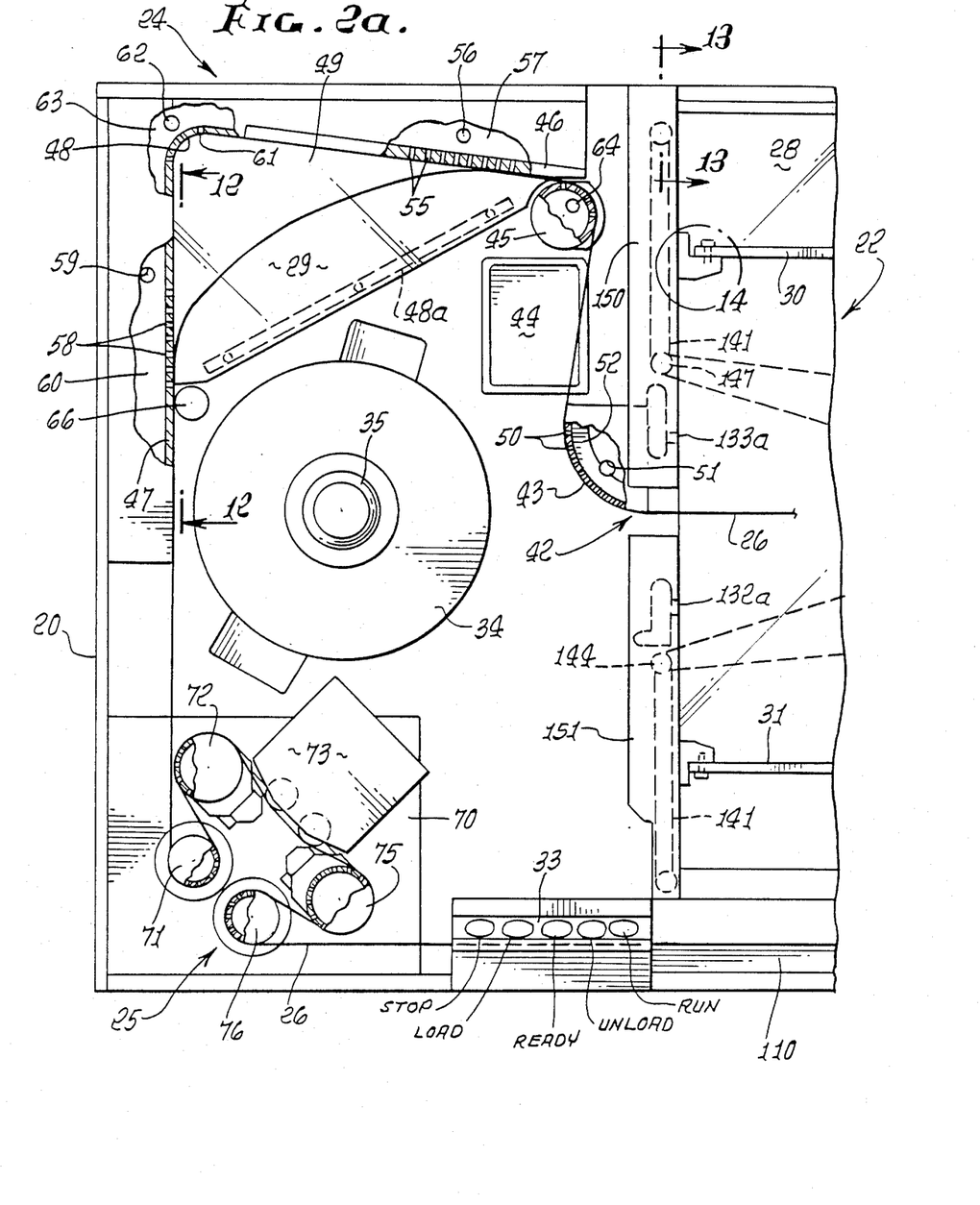
FIGS. 2a and 2b are top views partly in section taken along the line 2—2 of FIG. 1, with FIG. 2a showing the left end of the apparatus and FIG. 2b showing the right end.

The tape removal assembly 24 is shown in greater detail in FIG. 2a, with the tape 26 passing out of the bin 22 through the bin exit 42 and past a curved exit wall 43 which functions as a vacuum holdback wall, a conventional tape cleaner 44, an air bearing 45, and exit guide walls 46 and 47 which also are vacuum walls, to the reproduce head assembly 25. The walls 46, 47 are joined at a corner 48 and along with wall 48a form an exit pocket 49 under the cover 29.

Figure 12:
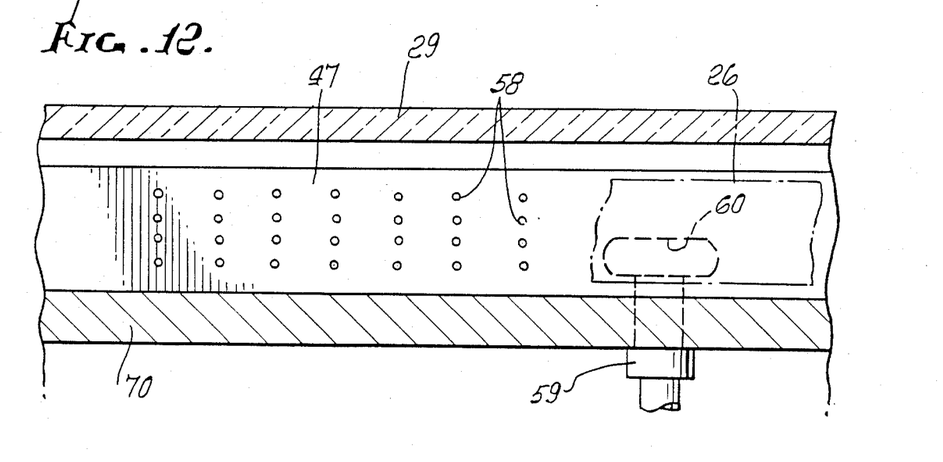

A plurality of openings 50 are provided in the curved exit wall 43, with these openings connected to a vacuum line 51 by a manifold 52. A plurality of openings 55 are provided in the exit guide wall 46 and are connected to a vacuum line 56 through manifold 57. A similar plurality of openings 58 are provided in the exit guide wall 47 and are connected to a vacuum line 59 through a manifold 60. (Also see FIG. 12.). Another plurality of openings 61 are provided at the corner 48 and are connected to a vacuum line 62 through manifold 63. An idler 66 is positioned adjacent the wall 47 to serve as a tape guide when feeding tape from and to the reel 34.

The air bearing 45 is a sleeve or tube with upper and lower ends closed and with a plurality of openings in a curved wall, with the interior of the sleeve connected to an air supply through line 64. Several such air bearings are utilized and the air bearing structure is shown in greater detail in FIGS. 5 and 6, to be described.

In operation, the carrier side of the tape faces the curved exit wall 43 and the exit guide walls 46, 47, while the magnetic material side of the tape faces the air bearing 45. The tape is urged against the wall 43 and the walls 46, 47 by the vacuum. The vacuum at the pocket 49 provides tension in the tape as it moves to the reproduce head assembly. The vacuum at the exit wall 43 provides additional tension in the tape and serves as a holdback block in the tape path. The pocket 49 also serves to provide a variable path loop for the tape. The magnitude of vacuum at the manifolds may be separately adjusted and the magnitude of the pressure at the air bearing may be separately adjusted as desired. This configuration permits close control of the tension in the tape as it moves from the substantially zero tension condition within the bin to the relatively high tension condition at the tape reproduce assembly.

The vacuum at the corner 48 helps to hold the tape against the walls 46, 47, varying the amount of contact surface at the walls and maintaining a smooth curve of the tape in the pocket 49. Typically the magnitude of the vacuum at the corner 48 is less than that at the walls 46, 47. The tension in the tape increases from zero at the bin exit 42 to about 300 grams at the reproduce head assembly 25, and is increased in three steps by the use of the three vacuum walls 43, 46 and 47. The vacuum walls 46, 47 and the vacuum corner 48 function to provide a self servoing compliance chamber at the pocket 49 to accomodate variations in the amount of tape in the pocket due to variation in the speed of the tape entering the pocket and maintain a constant or substantially constant speed for the tape leaving the pocket and thereby achieve the desired tape tension at the entrance to the reproduce head assembly.

In the embodiment illustrated, five push button switches are provided on the control pedestal 33 and provide the STOP, LOAD, READY, UNLOAD and RUN control as labeled on FIG. 2a.

Figure 3:
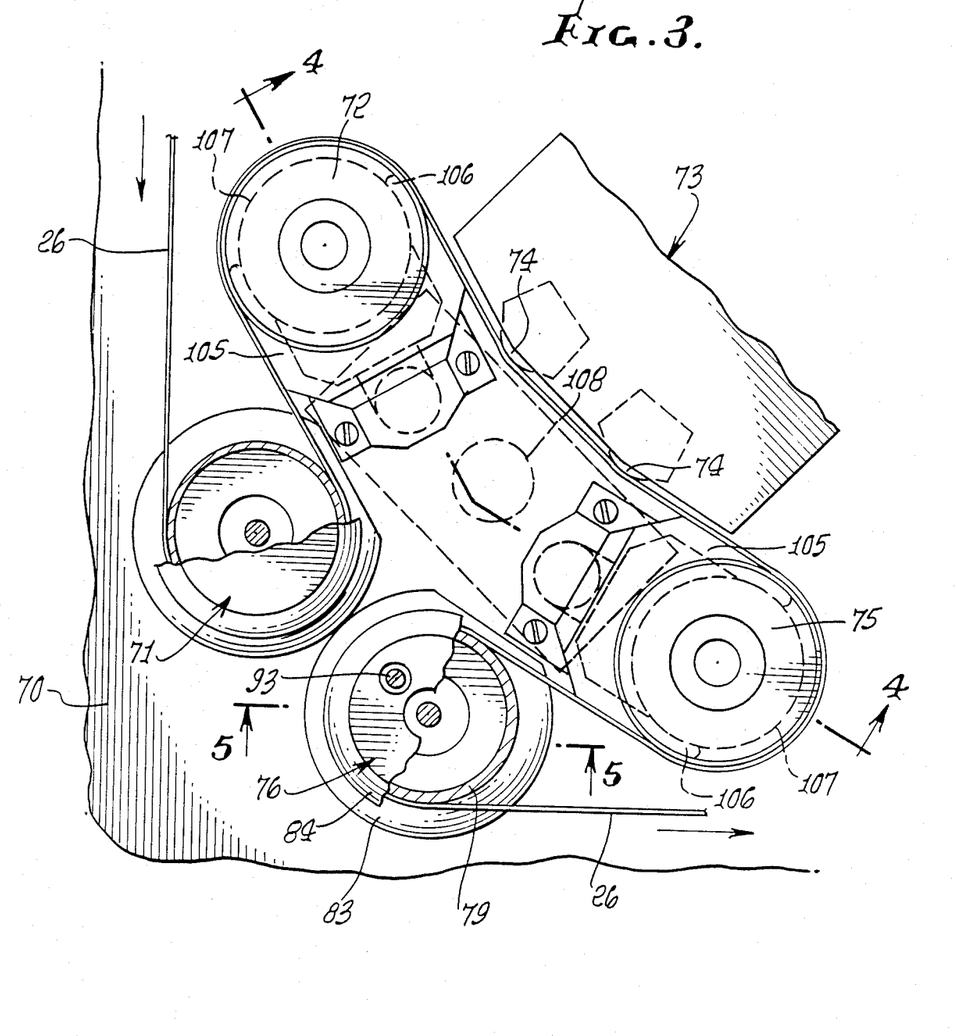

The reproduce head assembly 25 is shown in greater detail in FIG. 3. The components of the reproduce head assembly are carried on a support plate 70 which is mounted on top of the housing 20. A first air bearing 71, a first vacuum drive capstan 72, a magnetic head assembly 73 with magnetic heads 74, a second vacuum drive capstan 75, and a second air bearing 76 are carried on the support plate 70. The magnetic head assembly 73 may be conventional in design.

Figure 5:
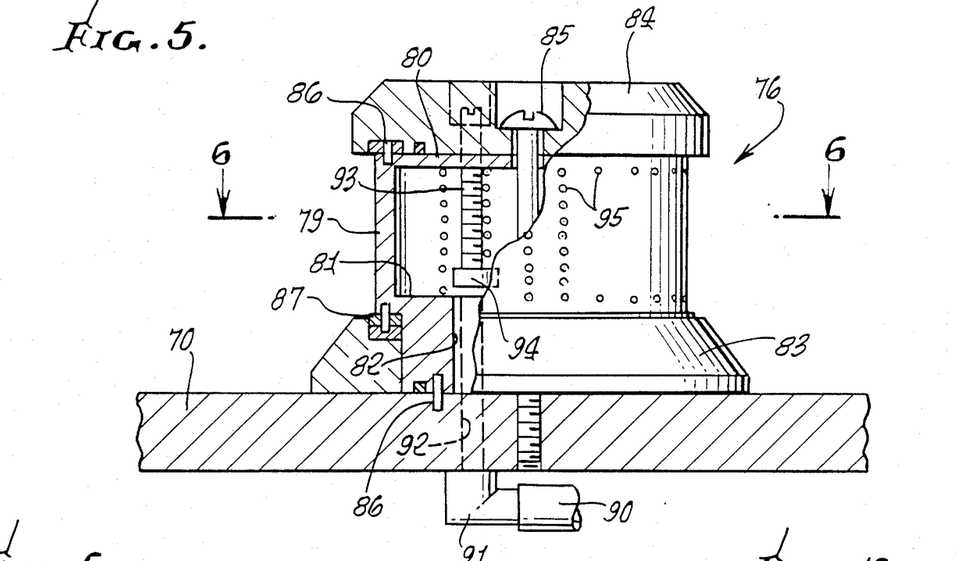
FIG. 5 is an enlarged sectional view taken along the line 5—5 of FIG. 3.
Figure 6:
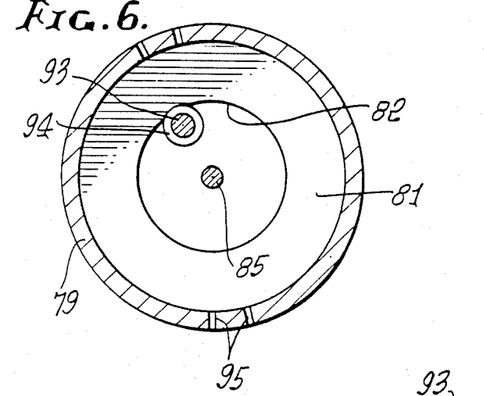
FIG. 6 is a sectional view taken along the line 6—6 of FIG. 5.

The air bearing 76 is shown in greater detail in FIGS. 5 and 6, and the air bearings 71 and 45 may be similarly constructed. The air bearing 76 includes an apertured sleeve 79 with a closed top 80 and a bottom 81 with an access opening 82. The sleeve 79 is mounted on a base 83 and has a cap 84, with the cap, sleeve and base mounted on the support plate 70 by a screw 85. Alignment pins 86 and edge guides 87 are provided between the cap and sleeve, the sleeve and base, and the sleeve and support plate, as illustrated.

Air under pressure is supplied to the interior of the air bearing sleeve 79 through a line 90 connected to a fitting 91 mounted in the plate 70, and through an air passage 92 through the plate. The rate of flow of air into the air bearing is controlled by an adjustment screw 93 with a cap 94 at its lower end for positioning at the outlet of the passage 92.

A plurality of openings 95 are provided through the wall of the sleeve 79 of the air bearing. Preferably, the openings are provided in an arc corresponding to that portion of the sleeve that the tape wraps around. Also, preferably the openings are produced in vertical columns at each end of the arc, typically two vertical columns at each end, and at the upper and lower edges in the arc between the end columns. This configuration is readily seen in FIGS. 5, 6, 9 and 10. The air bearing of FIGS. 9 and 10 differs from the air bearing of FIGS. 5 and 6 in the omission of the base 83 from the FIGS. 9 and 10 bearing.

In operation, air under pressure is provided to the interior of the air bearing sleeve and exits the air bearing through the openings 95. The tape 26 passes around a portion of the sleeve between the seals carried by the cap and base or support plate, as illustrated in FIG. 3. However the air flow outward through the openings in the air bearing prevent any contact of the bearing with the side of the tape, the only contact occurring being at the edges of the tape between the edge guides 87. This arrangement permits the magnetic material side of the tape to face the air bearings without any deleterious effect on the magnetic material carried by the tape.

Figure 4:
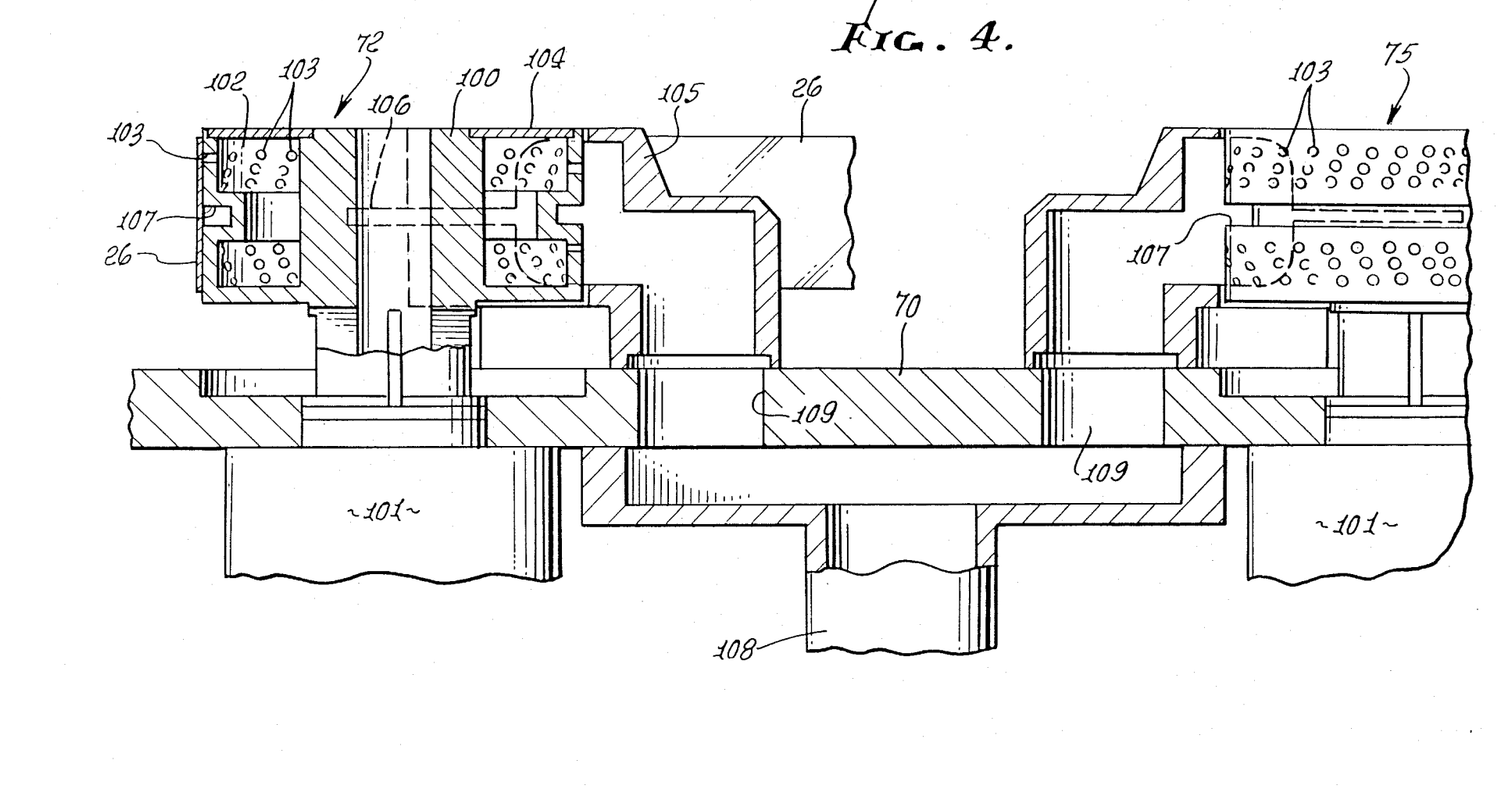
FIG. 4 is an enlarged sectional view taken along the line 4—4 of FIG. 3.

The vacuum drive capstans 72, 75 are shown in greater detail in FIG. 4 and may be identical in construction, with capstan 72 being described herein. A rotor 100 is mounted on and driven by a motor 101 carried on the plate 70. The rotor has an annular space 102 with a plurality of openings 103 in the outer wall with the space closed at the bottom by a portion of the rotor and at the top by a cover plate 104. A manifold 105 is positioned around a portion of the rotor 100, leaving the remainder of the apertured portion of the rotor exposed. A tape stripper finger 106 is carried on the manifold and rides in an annular groove 107 in the rotor for aid in moving the tape away from the rotor. A vacuum source is connected to the interior of the manifold 105 by a fitting 108 on the lower side of the plate 70, and a passage 109 through the plate 70. With the vacuum source operating, there is an air flow path from the exterior through the exposed openings in the rotor to the interior of the rotor, through the openings of the rotor at the manifold into the manifold, and through the passage in the plate to the fitting and the vacuum line.

In operation, the tape 26 is held against the rotor by the vacuum and hence is advanced at a speed determined by the speed of the drive motor. With the reproduce head assembly as shown and described, the tape is driven past the magnetic head or heads at a desired speed and under tension while having the magnetic material side of the tape contact only the magnetic head. The carrier side of the tape engages the rotors of the drive capstans, while the magnetic material side of the tape is held away from the air bearings as the tape moves around each air bearing.

Figure 2B:
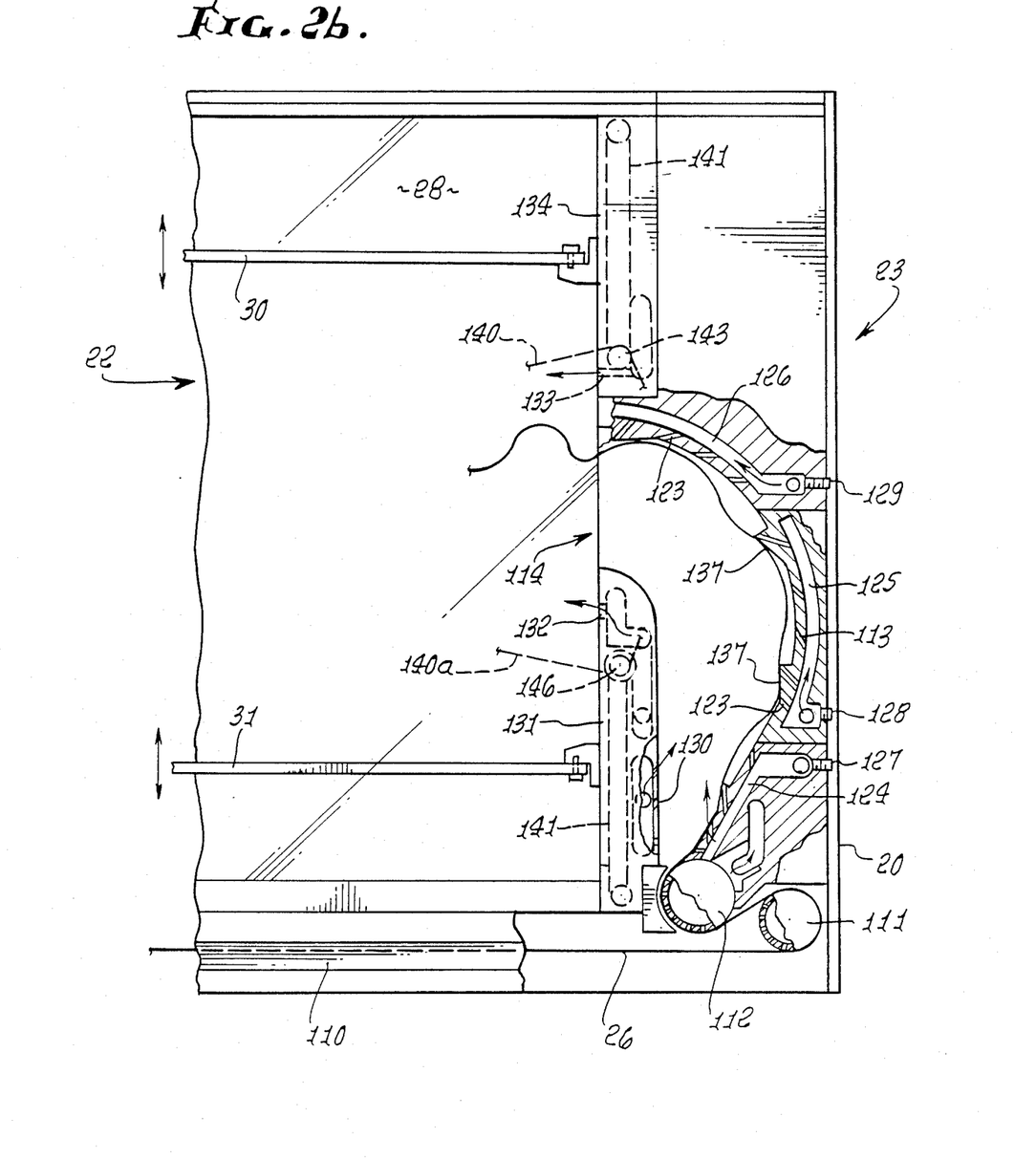
Figure 7:
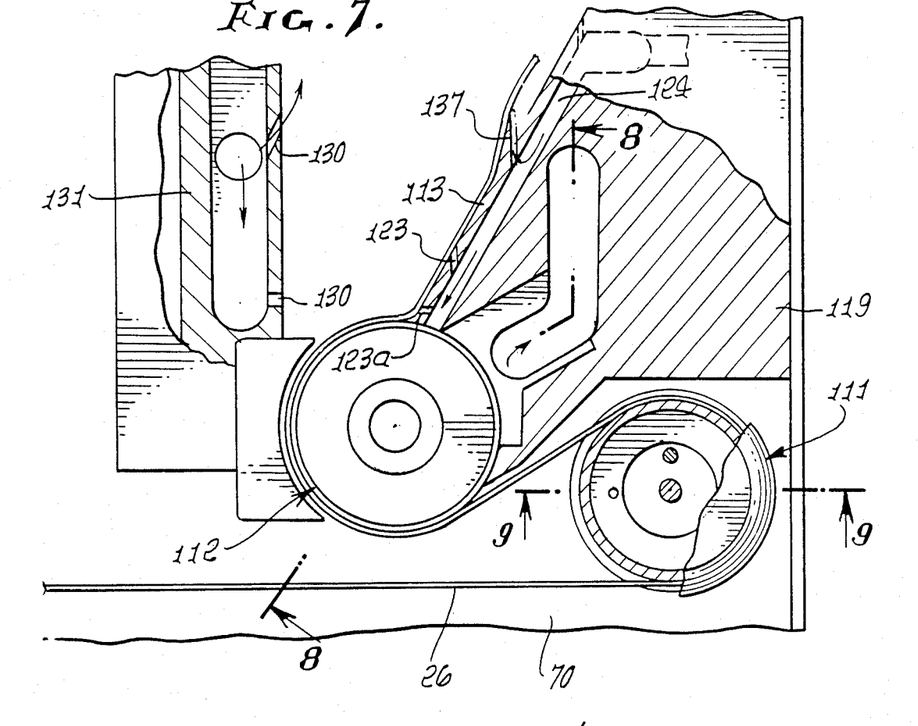
FIG. 7 is an enlarged view partly in section of a portion of FIG. 2b.
Figure 8:
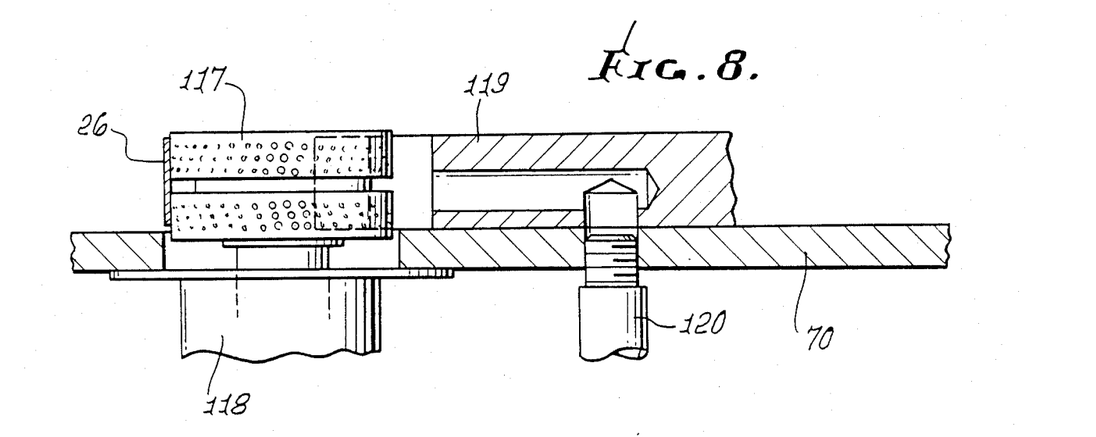
FIG. 8 is a sectional view taken along the line 8—8 of FIG. 7.

The tape injection assembly 23 is shown in greater detail in FIG. 2b and in FIGS. 7 and 8. On leaving the reproduce head assembly 25, the tape moves along the front of the apparatus, preferably under a protective cover 110, around an air bearing 111 and a vacuum drive capstan 112, along an entrance guide wall 113 and through a bin entrance 114 into the bin 22.

Figure 9:
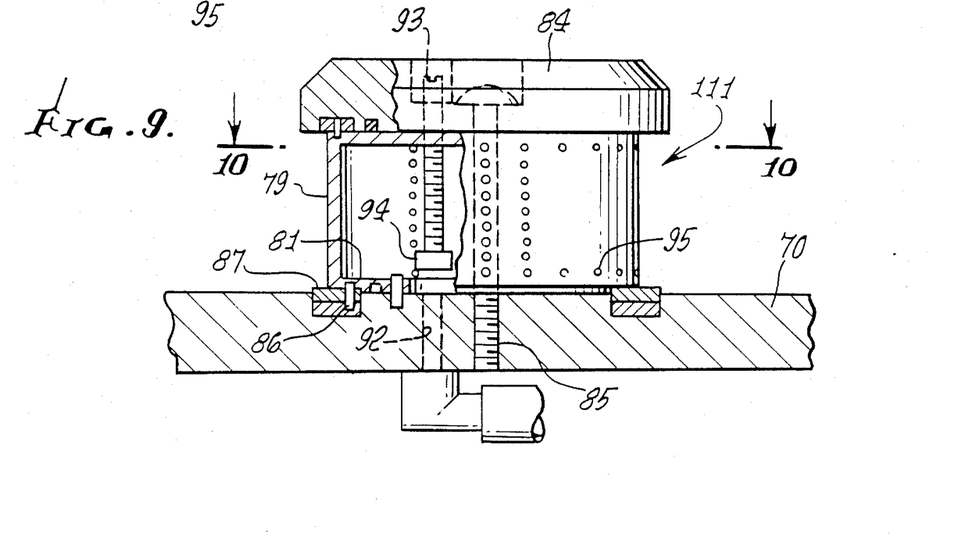
FIG. 9 is an enlarged sectional view taken along the line 9—9 of FIG. 7.
Figure 10:
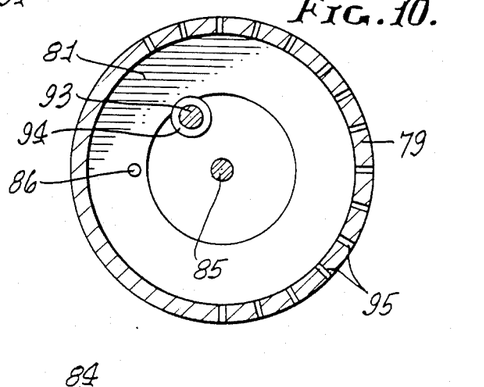
FIG. 10 is a sectional view taken along the line 10—10 of FIG. 9.

The air bearing 111 is shown in greater detail in FIGS. 9 and 10, and is essentially the same as the air bearing of FIGS. 5 and 6. The vacuum drive capstan 112 is essentially the same in construction as capstans 72, 75, and includes an apertured rotor 117 driven by a motor 118 within a manifold 119 which is connected to a vacuum source through line 120.

The preferred configuration of the entrance guide wall 113 is shown in FIG. 2b and includes a straight upstream section adjacent to capstan 112, which straight section has a smooth transition into a continuously curved section ending at the bin entrance 114. A plurality of openings 123 are provided in this wall, with the openings preferably being at an oblique angle to the wall surface to provide air flow in a downstream direction along the wall. Preferably, the air openings 123 are divided into three sets, with each set of openings supplied from a separate manifold 124, 125, 126, and with each manifold connected to the air supply with a flow rate adjustment screw 127, 128, 129, respectively, in the manifold supply line.

Three additional air supply sources are used in the preferred embodiment illustrated. Openings 130 in bin wall 131 provide for air flow into the area downstream of the vacuum drive capstan 112. Another opening 132 in the bin wall 131 provides air flow into the bin on one side of the bin entrance 114, and another opening 133 in bin wall 134 provides air flow into the bin on the opposite side of the bin entrance.

Similar openings 132a and 133a are provided in the bin walls 151 and 150, respectively, for providing air flow into the bin on opposite sides of the bin exit (FIG. 2a).

In the preferred embodiment, a plurality of irregularities are provided along the entrance guide wall 113, preferably comprising a series of ramps 137 spaced from one another, with each succeeding ramp of a greater height than the preceding ramp. Four ramps are used in the preferred embodiment, with the first ramp having a maximum height of about 1/16 inch and with the last ramp having a maximum height of about ¼ inch.

The vacuum capstan 112 preferably is configured to provide at least 180° of engagement with the tape for improved tape control. Another air opening 123a is provided in the wall 113 adjacent the capstan 112 to aid in stripping the tape from the capstan.

In operation, the tape is pulled around the air bearing 111 by the capstan 112 and is injected into the bin, with the tape moving at a relatively high speed as it leaves the capstan, this being substantially the linear speed of the tape at the reproduce head assembly. The tape injection assembly with the curved entrance guide wall and the relatively wide bin entrance functions to substantially reduce the momentum and forward velocity of the tape prior to entering the bin, and to produce a serpentine shape of the tape. With this arrangement, the tape is beginning to fold and enters the bin at a low forward speed. This is in contrast to the conventional design where the forward speed of the tape at the bin entrance is essentially the same as the tape linear speed from the drive capstan, with the result that the incoming tape shoots into the mass of tape in the bin in the same manner as water from a hose enters a pool, producing undesired agitation of the tape in the bin.

Figure 13:
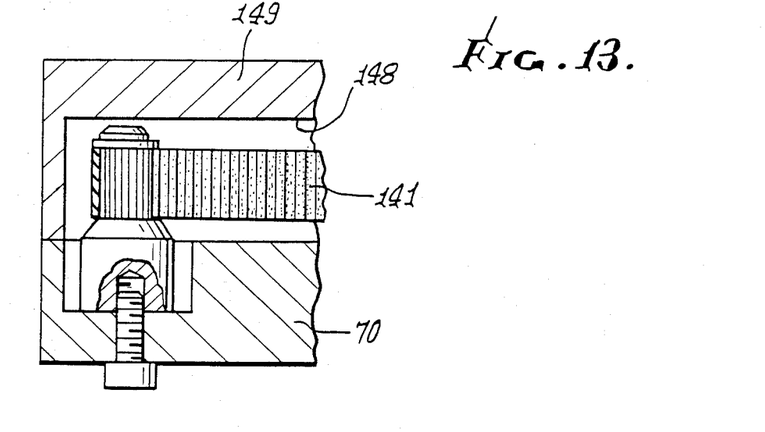
Figure 14:
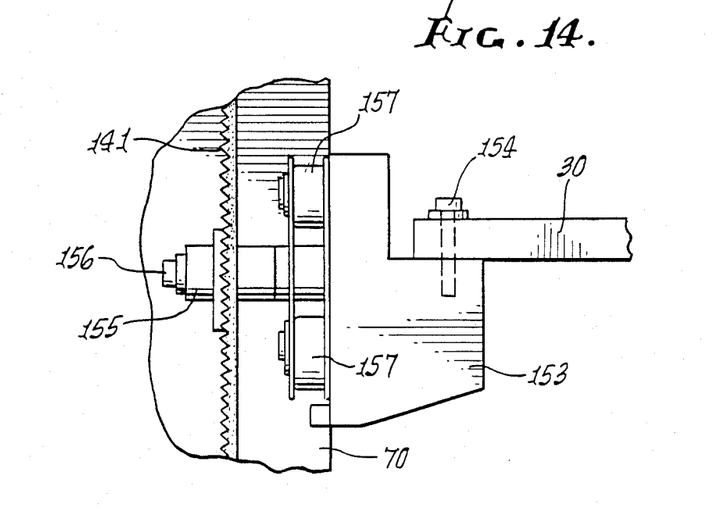

The bars 30, 31 which are moved laterally to vary the size of the bin, are driven by a pair of main belts 140, 140a which in turn drive four secondary belts 141. The main drive configuration is shown diagramatically in FIG. 11 and the secondary drive for one end of one bar is shown in FIGS. 2a, 13 and 14. The main belts 140, 140a are positioned within the housing 20 below the support plate 70. Belt 140 runs around a drive pulley 142 and pulleys 143 and 144, back to drive pulley 142; belt 140a runs around a drive pulley 145 and pulleys 146 and 147, back to drive pulley 145. The pulleys 142 and 145 are driven by a motor 148, with the motor 148 and pulleys 142, 145 mounted on a plate 149.

Figure 11:
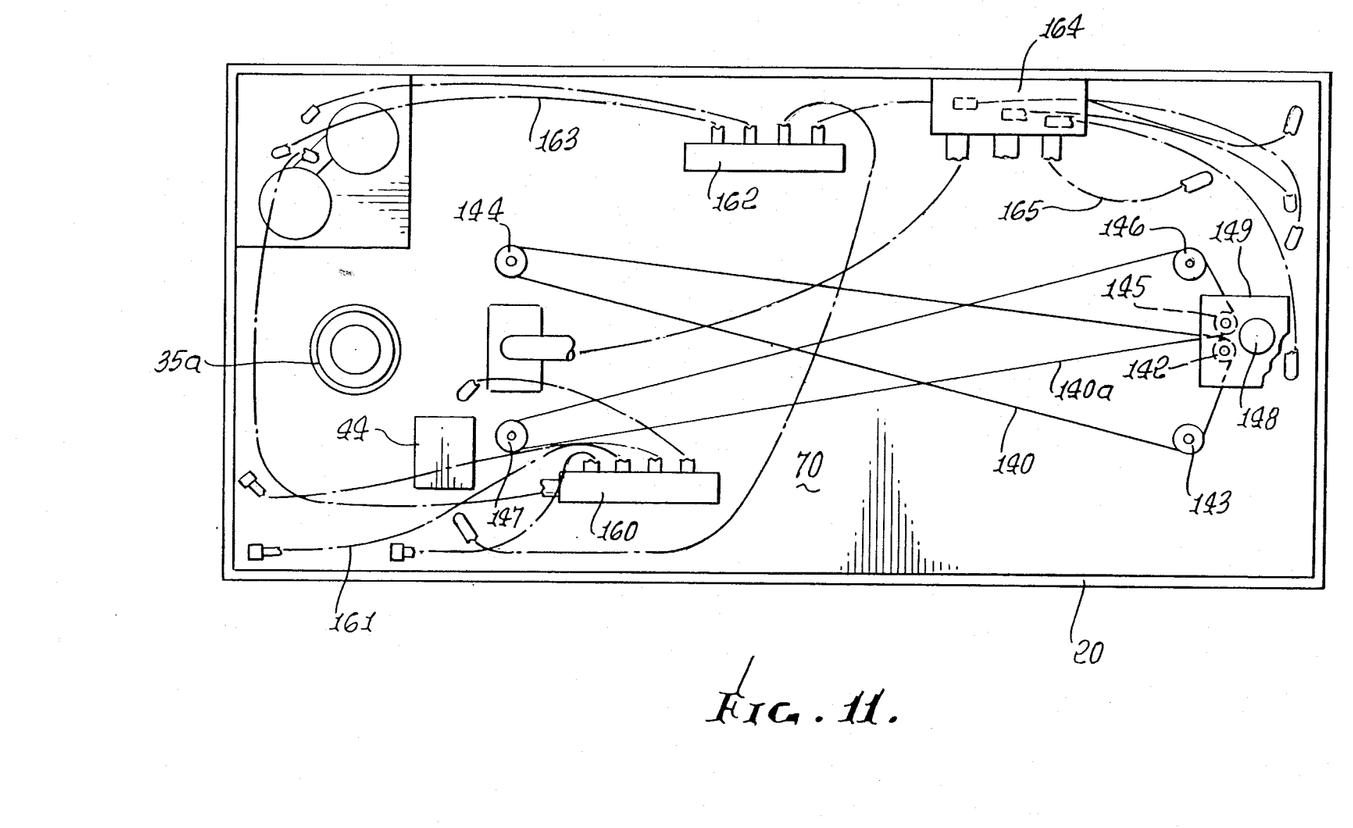
FIG. 11 is a sectional view taken along the line 11—11 of FIG. 1.

The pulley 147 drives a shaft which projects upward through the plate 70 to drive the secondary belt 141 which is positioned in an opening in bin wall 150. The pulley 144 similarly drives a secondary belt in bin wall 151, the pulley 146 drives another secondary belt in bin wall 131, and the pulley 143 drives another secondary belt in bin wall 134.

Turning to FIGS. 13 and 14, the bar 30 is attached to a bar holder 153 by a screw 154. The bar holder 153 in turn is connected to the secondary belt 141 by a clamp 155 and screw 156, and the holder is supported by rollers 157 attached to the holder and running on the plate 70. To change the bin size, the motor 148 is energized by the switch 32 to run in the desired direction. The motor drives the belts 140, 140a which in turn drive the four belts 141 thereby moving the bars toward each other or away from each other.

A vacuum manifold 160 is mounted on the underside of the plate 70 and provides a vacuum to the previously identified vacuum manifolds via lines indicated generally at 161 (FIG. 11). An air pressure manifold 162 is mounted on the underside of the plate 70 to provide a relatively high air pressure for the air bearings, and is connected to the various air bearings by lines indicated generally at 163. Another air pressure manifold 164 is mounted under the plate 70 to provide a low pressure air source for the air supply manifolds, via lines indicated generally at 165. A drive motor 35a for the reel drive hub 35 is supported from the plate 70.

We claim:

1. In a tape handling apparatus for storing an endless loop of tape in a bin and moving the tape from a bin exit past a reproduce head assembly to a bin entrance, the improvement including in combination:
   a tape injection assembly positioned at said bin entrance for injecting tape into said bin, and including
   tape injection drive means for moving said tape at a first forward speed, and
   an entrance guide wall defining a curved tape path between said tape injection drive means and said bin entrance, which curved tape path is concave when viewed from the bin,
   said entrance guide wall including separating means for separating the tape from said guide wall as the tape moves therealong, and with said guide wall spaced from the remainder of the tape handling apparatus providing an open space for said tape separation, and
   with said tape injection drive means positioned to move the tape toward and along said entrance guide wall producing a curved tape path and a serpentine tape shape reducing the tape forward speed prior to entering said bin.

2. An apparatus as defined in claim 1 including a bin wall adjacent said bin entrance, with said entrance guide wall and said bin wall defining said open space between said tape injection drive means and said bin entrance so that said tape injection drive means is spaced from said bin entrance, and wherein said entrance guide wall separating means has a plurality of air openings therein spaced along said entrance guide wall between said tape injection drive means and said bin entrance, and said apparatus includes air supply means for supplying air under pressure to said entrance guide wall air openings.

3. An apparatus as defined in claim 1 wherein said entrance guide wall separating means has a plurality of sets of air openings therein, with said sets of openings spaced along said entrance guide wall between said tape injection drive means and said bin entrance such that air flow from said openings induces a ripple in the tape moving along said entrance guide wall, and
   said apparatus includes a corresponding plurality of air supply means for supplying air under pressure to each of said sets of openings, respectively, and with each of said air supply means including means for adjusting the rate of air flow to the set of openings.

4. An apparatus as defined in claim 3 wherein said air openings define air paths at an oblique angle to said entrance guide wall surface providing air flow from said wall in the tape downstream direction.

5. An apparatus as defined in any of claims 1, 2, and 4 wherein said separating means includes a plurality of irregularities in the shape of the wall along said guide wall.

6. An apparatus as defined in any of claims 1, 2, 3 and 4 wherein said separating means includes a series of ramps spaced therealong.

7. An apparatus as defined in claim 6 wherein each succeeding ramp is of greater height than the preceding ramp.

8. An apparatus as defined in claim 1 wherein said entrance guide wall includes a straight section adjacent said tape injection drive means, with said straight section transitioning to a continuous curve which terminates at said bin entrance.

9. An apparatus as defined in claim 8 including a bin wall section on each side of said bin entrance, and
   at least one air opening in each of said in wall sections for directing air into said bin.

10. An apparatus as defined in claim 9 wherein said tape injection drive means includes:
    a motor-driven apertured drive sleeve;
    a manifold, with said drive sleeve rotating within said manifold with a portion of said drive sleeve exposed; and
    vacuum supply means for supplying a vacuum to said manifold for adhering a tape to said sleeve in driving relation as said sleeve rotates.

11. An apparatus as defined in claim 10 wherein said tape has a first carrier side and a second magnetic material side, and including:
    an apertured bearing sleeve; and
    additional air supply means for supplying air under pressure to said bearing sleeve,
    with said tape first side facing said drive sleeve and said guide wall, and with said tape second side facing said bearing sleeve, and
    with said bearing sleeve, drive sleeve and guide wall positioned for tape movement about and spaced from said bearing sleeve, in engagement and moving with said drive sleeve, and along said entrance guide wall through said bin entrance into said bin.

12. An apparatus as defined in claim 1 wherein said reproduce head assembly includes
    first and second air bearings,
    first and second vacuum drive capstans, and
    a magnetic head assembly,
    with said air bearings and drive capstans positioned to define a tape path from said bin exit past said first air bearing, said first drive capstan, said head assembly, said second drive capstan and said second air bearing to said bin entrance, with the carrier side of said tape facing said drive capstans and with the magnetic material side of said tape facing said air bearings and said head assembly.

13. An apparatus as defined in claim 12 wherein each of said air bearings comprises
    an apertured bearing sleeve, and
    air supply means for supplying air under pressure to said bearing sleeve, and
    each of said vacuum drive capstans comprises
    a motor-driven apertured drive sleeve, a manifold, with said drive sleeve rotating within said manifold with a portion of said drive sleeve exposed, and vacuum supply means for supplying a vacuum to said manifold for adhering a tape to said sleeve as said sleeve rotates.

14. In a tape handling apparatus for storing an endless loop of tape in a bin and moving the tape from a bin exit past a reproduce head assembly to a bin entrance, the improvement including in combination:

a tape injection assembly positioned at said bin entrance for injecting tape into said bin, and including tape injection drive means for moving said tape at a first forward speed, and an entrance guide wall defining a curved tape path between said tape injection drive means and said bin entrance, with said tape injection drive means positioned to move the tape along said entrance guide wall producing a curved tape path and reducing the tape forward speed prior to entering said bin, and with said entrance guide wall having a plurality of air openings therein, and with said apparatus including air supply means for supplying air under pressure to said entrance guide wall air openings, and wherein said air openings define air paths at an oblique angle to said entrance guide wall surface providing air flow from said wall in the tape downstream direction.

15. An apparatus as defined in claim 14 wherein said entrance wall includes a series of ramps spaced therealong.

16. In a tape handling apparatus for storing an endless loop of tape in a bin and moving the tape from a bin exit past a reproduce head assembly to a bin entrance, the improvement including in combination:

a tape injection assembly positioned at said bin entrance for injecting tape into said bin, and including tape injection drive means for moving said tape at a first forward speed, and an entrance guide wall defining a curved tape path between said tape injection drive means and said bin entrance, with said tape injection drive means positioned to move the tape along said entrance guide wall producing a curved tape path and reducing the tape forward speed prior to entering said bin; and a tape removal assembly positioned at said bin exit for removing tape from said bin, and including first and second exit guide walls joined at a corner to form an exit pocket, with a set of vacuum openings in each of said exit guide walls, and vacuum supply means for supplying a vacuum to each of said sets of vacuum openings, with said reproduce head assembly including reproduce drive means for moving said tape along an exit path from said bin through said bin exit and said pocket to said reproduce head assembly.

17. An apparatus as defined in claim 16 including at least one vacuum opening in said exit pocket at said corner, and additional vacuum supply means for supplying a vacuum to said vacuum openings at said corner.

18. An apparatus as defined in claim 17 including a curved exit wall at said bin exit with said exit wall having a plurality of vacuum openings therein, and additional vacuum supply means for supplying a vacuum to said exit wall vacuum openings and applying tension to said tape between said curved exit wall and said reproduce drive means.

19. An apparatus as defined in claim 18 wherein said tape has a first carrier side and a second magnetic material side, and including an apertured exit bearing sleeve; and air supply means for supplying air under pressure to said bearing sleeve, with said tape first side facing said exit guide walls and with said tape second side facing said bearing sleeve, and with said bearing sleeve, exit guide walls and reproduce drive means positioned for tape movement from said bin through said bin exit about and spaced from said bearing sleeve through said pocket in engagement with portions of said exit guide walls and spaced from said corner to said reproduce head assembly.

20. In a tape handling apparatus for storing an endless loop of tape in a bin and moving the tape from a bin exit past a reproduce head assembly to a bin entrance, the improvement including in combination:

a tape removal assembly positioned at said bin exit for removing tape from said bin, and including first and second exit guide walls joined at a corner to form an exit pocket, with a set of vacuum openings in each of said exit guide walls, and vacuum supply means for supplying a vacuum to each of said sets of vacuum openings, with said reproduce head assembly including reproduce drive means for moving said tape along an exit path from said bin through said bin exit and said pocket to said reproduce head assembly.

21. An apparatus as defined in claim 20 including at least one vacuum opening in said exit pocket at said corner, and additional vacuum supply means for supplying a vacuum to said openings at said corner.

22. In a tape handling apparatus for storing an endless loop of tape in a bin and moving the tape from a bin exit past a reproduce head assembly to a bin entrance, the improvement including in combination:

a tape removal assembly positioned at said bin exit for removing tape from said bin, and including first and second exit guide walls joined at a corner to form an exit pocket, with a set of vacuum openings in each of said exit guide walls, and vacuum supply means for supplying a vacuum to each of said sets of vacuum openings, with said reproduce head assembly including reproduce drive means for moving said tape along an exit path from said bin throgh said bin exit and said pocket to said reproduce head assembly, with a curved exit wall at said bin exit with said exit wall having a plurality of vacuum openings therein, and additional vacuum supply means for supplying a vacuum to said exit wall vacuum openings and applying tension to said tape between said curved exit wall and said reproduce drive means.

23. An apparatus as defined in any of claims 20-22 wherein said tape has a first carrier side and a second magnetic material side, and including an apertured exit bearing sleeve; and air supply means for supplying air under pressure to said bearing sleeve, with said tape first side facing said exit guide walls and with said tape second side facing said bearing sleeve, and with said bearing sleeve, exit guide walls and reproduce drive means positioned for tape movement from said bin through said bin exit about and spaced from said bearing sleeve through said pocket in engagement with portions of said exit guide walls and spaced from said corner to said reproduce head assembly.

24. An apparatus as defined in claim 23 wherein said reproduce head assembly includes
   first and second air bearings,
   first and second vacuum drive capstans, and
   a magnetic head assembly,
   with said air bearings and drive capstans positioned to define a tape path from said bin exit through said exit pocket and past said first air bearing, said first drive capstan, said head assembly, said second drive capstan and said second air bearing to said bin entrance, with said vacuum at said exit guide walls of said pocket providing tension in said tape, and with the carrier side of said tape facing said exit guide walls and said drive capstans and with the magnetic material side of said tape facing said air bearings and said head assembly.

25. An apparatus as defined in claim 24 wherein each of said air bearings comprises
   an apertured bearing sleeve, and
   air supply means for supplying air under pressure to said bearing sleeve, and
   each of said vacuum drive capstans comprises
   a motor-driven apertured drive sleeve,
   a manifold, with said drive sleeve rotating within said manifold with a portion of said drive sleeve exposed, and
   vacuum supply means for supplying a vacuum to said manifold for adhering a tape to said sleeve as said sleeve rotates.

26. In a tape handling apparatus for storing an endless loop of tape in a bin and moving the tape from a bin exit past a reproduce head assembly to a bin entrance, the improvement wherein said reproduce head assembly includes
   first and second air bearings,
   first and second vacuum drive capstans, and
   a magnetic head assembly,
   with said air bearings and drive capstans positioned to define a tape path from said bin exit past said first air bearing, said first drive capstan, said head assembly, said second drive capstan and said second air bearing to said bin entrance, with the carrier side of said tape facing said drive capstans and with the magnetic material side of said tape facing said air bearings and said head assembly.

27. An apparatus as defined in claim 26 wherein each of said air bearings comprises
   and apertured bearing sleeve, and
   air supply means for supplying air under pressure to said bearing sleeve, and
   each of said vacuum drive capstans comprises
   a motor-driven apertured drive sleeve,
   a manifold, with said drive sleeve rotating within said manifold with a portion of said drive sleeve exposed, ad
   vacuum supply means for supplying a vacuum to said manifold for adhering a tape to said sleeve as said sleeve rotates.

* * * * *